United States Patent
Sgreccia et al.

(10) Patent No.: US 11,731,458 B2
(45) Date of Patent: Aug. 22, 2023

(54) SOLID TIRE PROVIDED WITH CUSHIONING HOLES

(71) Applicant: TRELLEBORG WHEEL SYSTEMS ITALIA S.P.A., Tivoli-Villa Adriana (IT)

(72) Inventors: Mario Sgreccia, Marino (IT); Stefano Lobene, Colonnella (IT); Gianluca Meloro, Guidonia Montecelio (IT); Gianni Agametti, Ripi (IT); Gianluca Abbati, Colleferro (IT)

(73) Assignee: TRELLEBORG WHEEL SYSTEMS ITALIA S.P.A.

( * ) Notice: Subject to any disclaimer, the term of this patent is extended or adjusted under 35 U.S.C. 154(b) by 409 days.

(21) Appl. No.: 16/982,652

(22) PCT Filed: Mar. 23, 2018

(86) PCT No.: PCT/IT2018/000044
§ 371 (c)(1),
(2) Date: Sep. 21, 2020

(87) PCT Pub. No.: WO2019/180750
PCT Pub. Date: Sep. 26, 2019

(65) Prior Publication Data
US 2021/0178815 A1     Jun. 17, 2021

(51) Int. Cl.
*B60C 7/10* (2006.01)
(52) U.S. Cl.
CPC ............... *B60C 7/107* (2021.08); *B60C 7/10* (2013.01)

(58) Field of Classification Search
CPC .................................. B60C 7/10; B60C 7/107
See application file for complete search history.

(56) References Cited

U.S. PATENT DOCUMENTS

| | | | |
|---|---|---|---|
| 1,237,227 A | 8/1917 | Swartz | |
| 5,343,916 A * | 9/1994 | Duddey | ............ B60C 7/12 152/5 |
| 2002/0092589 A1 | 7/2002 | Katoh et al. | |

(Continued)

FOREIGN PATENT DOCUMENTS

| | | | | |
|---|---|---|---|---|
| EP | 0502353 A1 | 9/1992 | | |
| GB | 2587247 A * | 3/2021 | ............ | B60C 11/03 |

(Continued)

OTHER PUBLICATIONS

Friedrich Wilhelm Riegels: "Aerofoil sections", Jan. 1, 1961; London, England.

*Primary Examiner* — Kip T Kotter
(74) *Attorney, Agent, or Firm* — Bookoff McAndrews, PLLC

(57) ABSTRACT

Described herein is a resilient tyre (1) designed to be used on industrial and construction machinery, said resilient tyre (1) comprising a plurality of circular layers of elastic material set on top of one another in the radial direction, said layers forming, proceeding from the centre of the resilient tyre (1) towards the periphery, an inner portion referred to as base (2), an outer portion referred to as tread (3), and two lateral surfaces (4, 4') with height (Q). The resilient tyre (1) comprises a plurality of cushioning holes (7) made in both of the lateral surfaces (4, 4') of the resilient tyre (1), said cushioning holes (7) substantially having a wing-like shape.

10 Claims, 10 Drawing Sheets

(56) References Cited

U.S. PATENT DOCUMENTS

2005/0133133 A1* 6/2005 Becker .................. B60C 7/10
                                                             152/323
2007/0029020 A1* 2/2007 Wietharn ................ B60C 7/10
                                                             152/324

FOREIGN PATENT DOCUMENTS

| JP | 2010058556 A | | 3/2010 |
|----|--------------|---|--------|
| KR | 20160001394 A | * | 1/2016 |
| WO | 9605917 A1 | | 2/1996 |
| WO | 9718959 A1 | | 5/1997 |
| WO | 2008045194 A1 | | 4/2008 |

* cited by examiner

SOLID TIRE PROVIDED WITH CUSHIONING HOLES

The present invention relates to a solid tyre for industrial and construction applications provided with particular holes designed to reduce transmission of vibrations to the operator.

FIELD OF THE INVENTION

As is well known, in industrial and construction applications wheels made of rubber with a solid structure, also referred to as "solid tyres", are frequently used.

BACKGROUND

A known type of solid tyres are resilient tyres, which are structurally made up of a plurality of circular layers of elastic material set on top of one another in the radial direction, said layers typically forming, proceeding from the centre of the tyre towards the periphery, at least one inner portion referred to as "base" and one outer portion referred to as "tread".

Resilient tyres are used on many types of construction machines, industrial vehicles, dollies, and trailers. In particular, they are widely used in machines for moving materials, such as loaders, since these tyres are very resistant to puncturing. Consider, for example, construction and industrial applications that require management of metal waste, which frequently presents cutting edges and would puncture inflated tyres.

In order to be resistant to punctures, known resilient tyres are obtained with a mix of materials with a high hardness, typically 85±10 Sh A for the base (where Sh is the unit of measurement of the Shore scale for testing the hardness of elastomers) and 70±5 Sh A for the tread.

SUMMARY

However, industrial and construction machines, and in particular loaders, that mount tyres that are so hard, prove uncomfortable for the driver, since such vehicles are not equipped with suspensions. The springs present underneath the driver's seat and the low elasticity offered by the tyres represent in fact the only form of suspension of the vehicle.

In order to render the resilient tyres softer, the present applicant has already filed the patent application PCT/IT2017/000242 regarding a resilient solid tyre that comprises a tread obtained with a mix that has a hardness of between 45 and 65 Sh A, and a plurality of cushioning holes made in at least one of the lateral surfaces of the resilient tyre. Thanks to the aforesaid hardness and the cushioning holes, the effects of the vibrations and of the impact transferred to the operator are considerably reduced.

However, a hardness of the tread of between 45 and 65 Sh A entails a fast deterioration of the tread and a consequent reduction of the service life of the resilient tyre.

The aim of the present invention is to provide a resilient solid tyre with improved cushioning properties and, hence, in which there is an increase in the capacity for absorption of vibrations and impact on the driver.

A further aim of the present invention is to provide a resilient tyre that will moreover present a longer duration and, hence, a better resistance to deterioration.

According to the present invention, the aforesaid aims are achieved by a resilient solid tyre according to claim 1.

BRIEF DESCRIPTION OF THE DRAWING FIGURES

The characteristics and advantages of the present invention will emerge clearly from the ensuing detailed description of a practical embodiment thereof, which is illustrated by way of non-limiting example in the annexed drawings, wherein.

DETAILED DESCRIPTION

Figure 1:
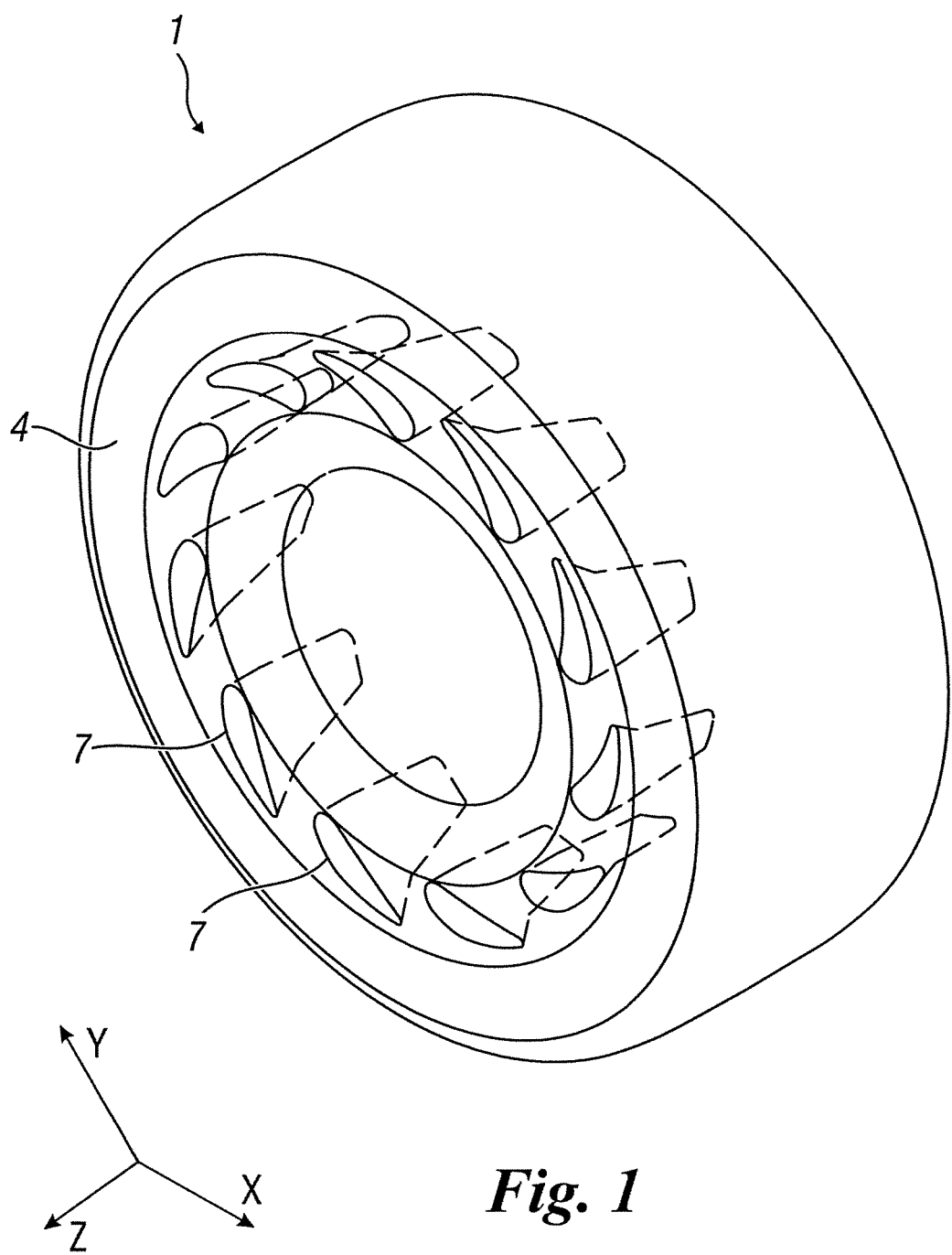
FIG. 1 is a perspective view of a resilient tyre according to the present invention.

With reference to FIG. 1, a resilient solid tyre according to the present invention is designated as a whole by the reference number 1.

The resilient tyre 1 is configured for being used in construction and industrial applications on many types of vehicles such as means for moving materials. In particular, among such means, there are loaders, which are machines used for moving material, such as building rubble or industrial waste of any type (for example, metals), in order to displace it and load it onto lorries, which then convey it to the final dump.

Figure 3:
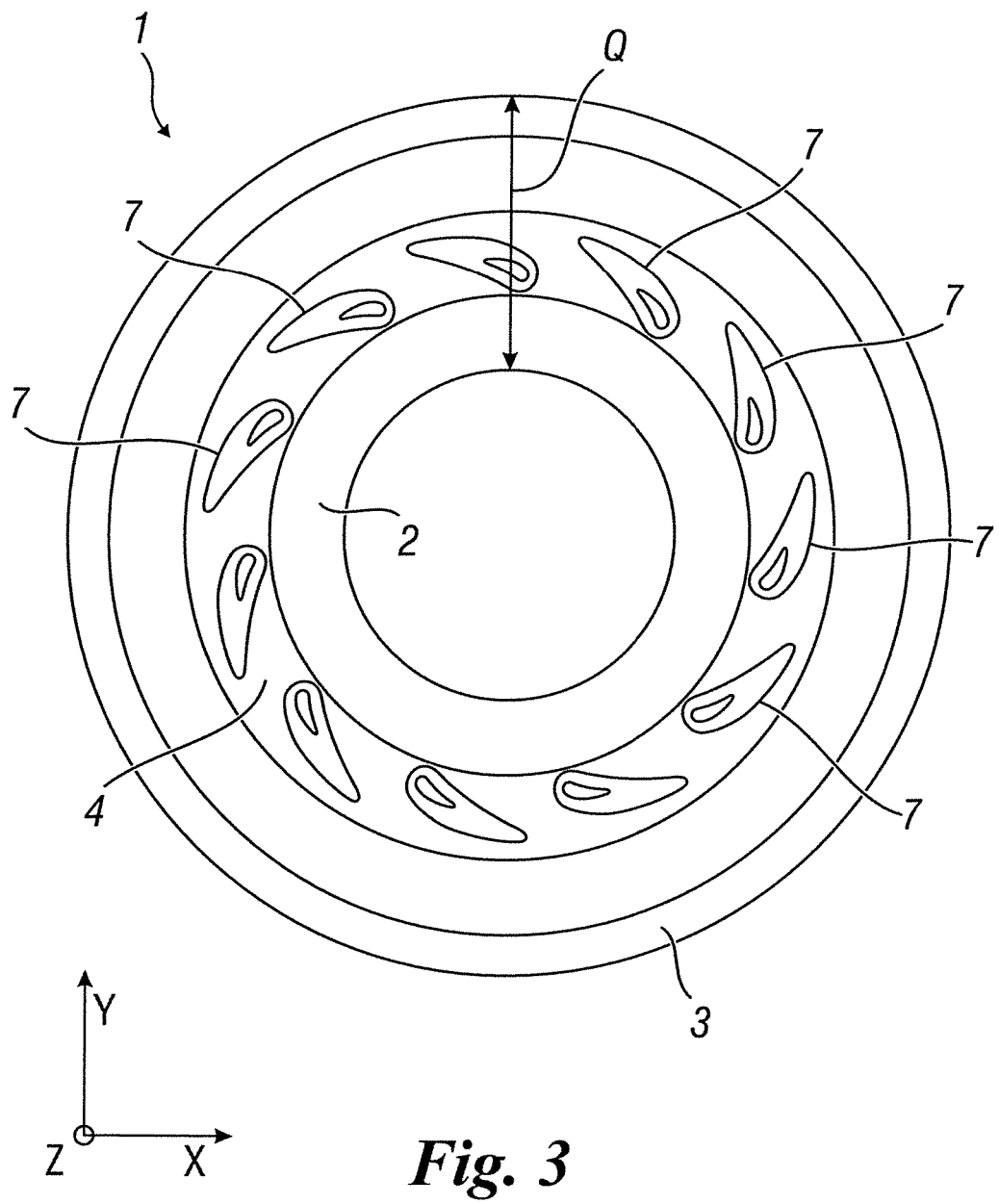
FIG. 3 shows a front view of the resilient tyre of FIG. 1.

Structurally, with reference to FIG. 3, the resilient tyre 1 comprises a plurality of circular layers of elastic material set on top of one another in the radial direction, said layers forming, proceeding from the centre of the resilient tyre towards the periphery, an inner portion referred to as base 2, an outer portion referred to as tread 3, and two lateral surfaces (or sides) 4, 4' of height Q. The height Q is also known as "section height".

In particular, the base 2 is the portion of the tyre 1 that is mounted around the rim, which is in turn rendered fixed with respect to the axle that sets the wheel in rotation. Preferably, the base 2 has a hardness of 80±15 Sh A (where Sh is the unit of measurement of the Shore scale for testing the hardness of elastomers). The tread 3, instead, is the portion of the structure of the resilient tyre 1 that comes into contact with the ground on which the wheel turns.

The tread 3 may be smooth or else may be provided with grooves the number, shape, and depth of which vary according to the use to which the tyre is put.

Moreover, the resilient tyre 1 comprises a plurality of cushioning holes 7 made in both of the lateral surfaces 4, 4' of the resilient tyre 1, said holes 7 being designed to function as suspension of the construction machine in order to reduce the effects of repeated vibrations and impacts caused by the vehicle on the operator.

Figure 5:
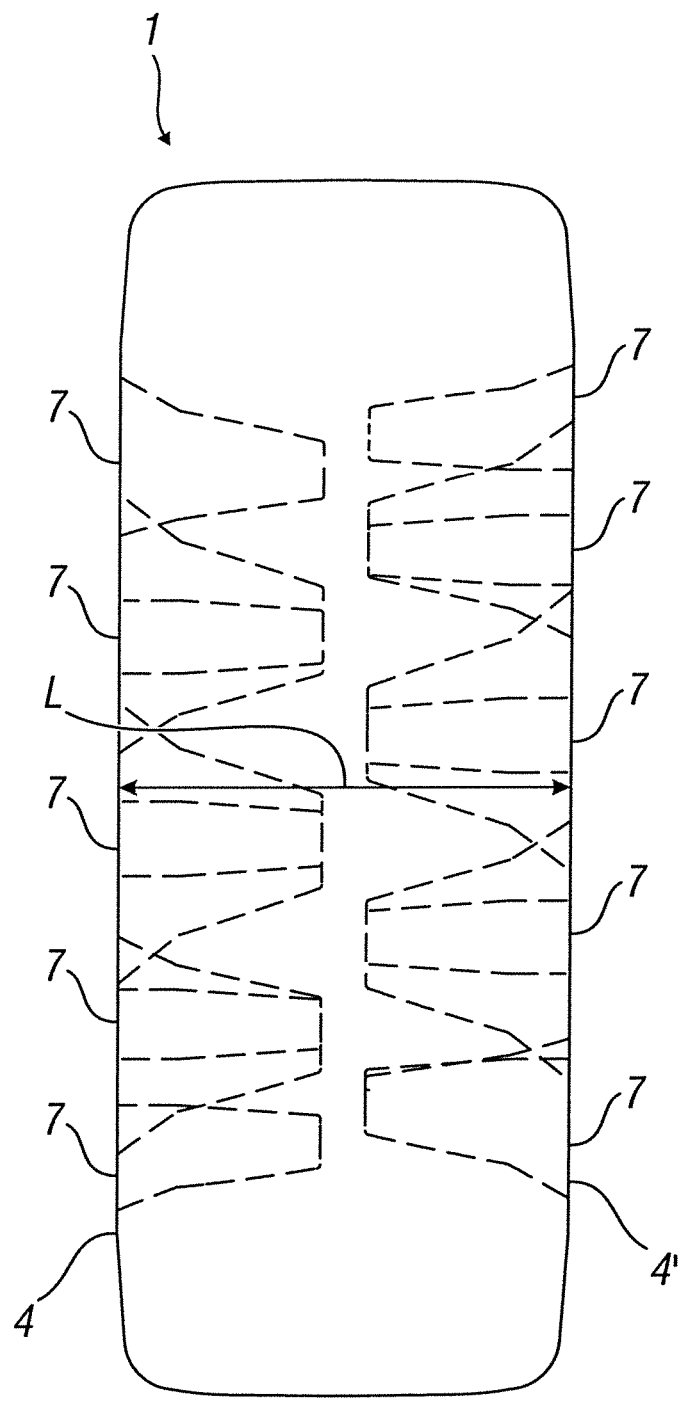
FIG. 5 shows a side view of the resilient tyre of FIG. 1.
Figure 6:
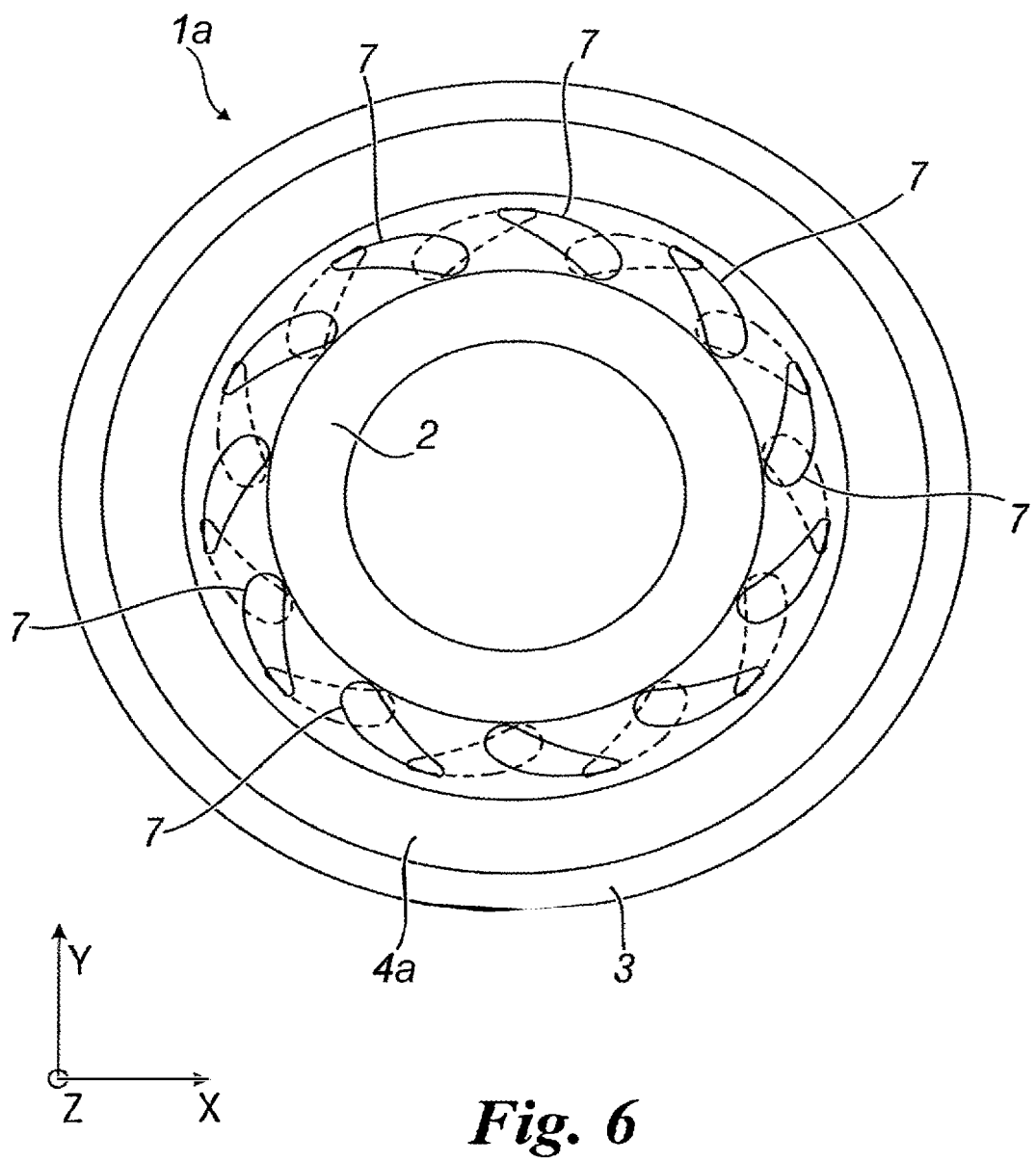
FIGS. 6-9 show further front views of different embodiments of the resilient tyre according to the present invention.

To facilitate understanding by the person skilled in the sector, FIG. 1 shows only the holes 7 made in the lateral surface 4, whereas, in a desired way, the holes 7 made in the other lateral surface, i.e., the surface 4', are not illustrated. However, as has already been said and as shown in FIGS. 5 and 6, the holes are made in both of the lateral surfaces 4, 4' of the resilient tyre 1.

To further clarify the description of the resilient tyre 1, according to the present invention, a cartesian reference system X, Y, Z will here be adopted, where the axis Z is parallel to the axis of rotation of the tyre 1, and the axes X, Y, orthogonal to the axis Z, represent the plane of the lateral surfaces 4, 4' of the tyre 1.

Figure 2:
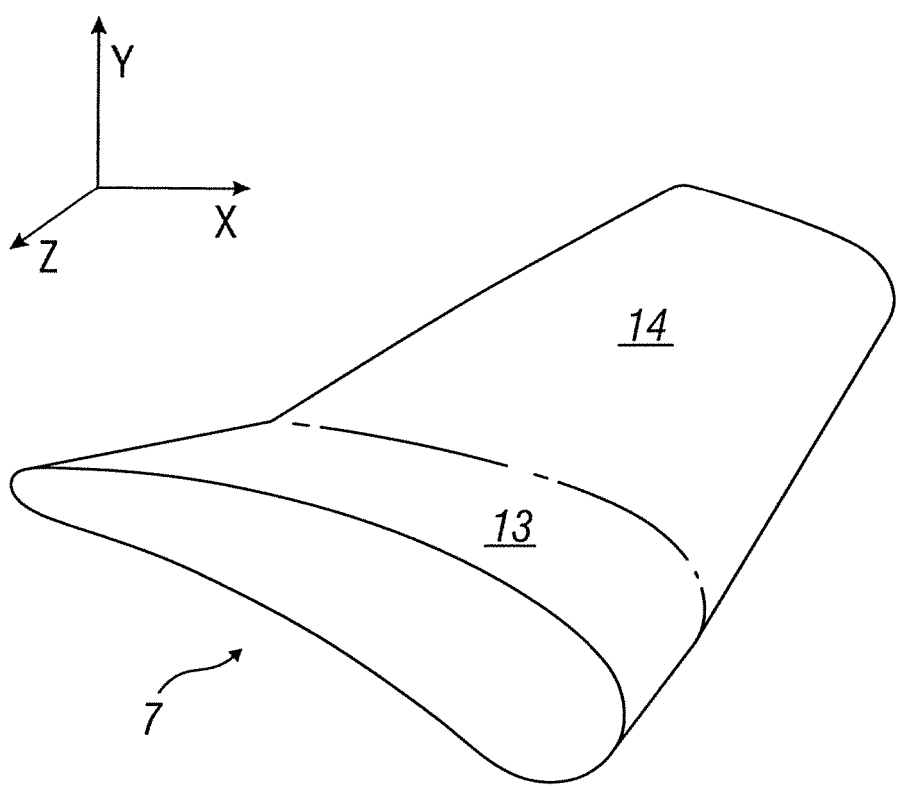
FIG. 2 shows the detail of a hole comprised in the resilient tyre of FIG. 1.

As shown more clearly in FIG. 2, the holes 7 have substantially a wing-like shape.

Moreover, each hole 7 has an oblong shape that, starting from the aperture made in the lateral surface 4, 4', tapers towards the inside of the tyre 1. In other words, each hole 7 has transverse dimensions that decrease proceeding, in the direction of the axis Z, from the lateral surface 4, 4' towards the inside of the tyre 1.

The hole 7 may comprise a first portion 13, in the proximity of the lateral surface 4, 4', and a second portion 14, which is more internal, said first portion 13 being tapered with a decrease per unit length along the axis Z that is the same as, or faster than, that of the second portion 14 (as is, for example, shown in FIG. 2).

Consequently, the end of each hole 7 has substantially the shape of the aperture made in the lateral surface 4, 4', being, however, smaller than said aperture.

Figure 4A:
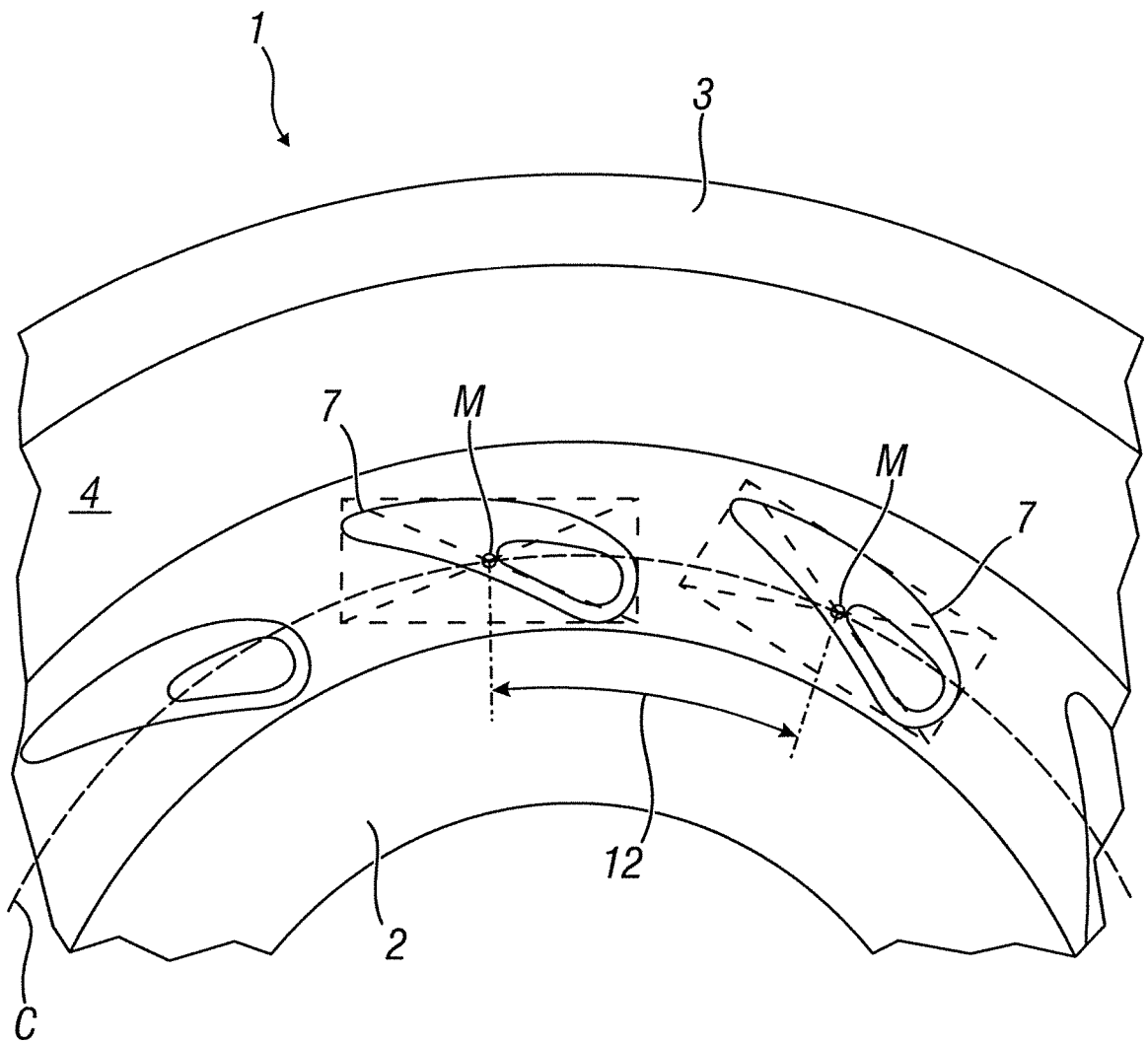
FIG. 4a shows a detail of the view of FIG. 3.
Figure 4B:
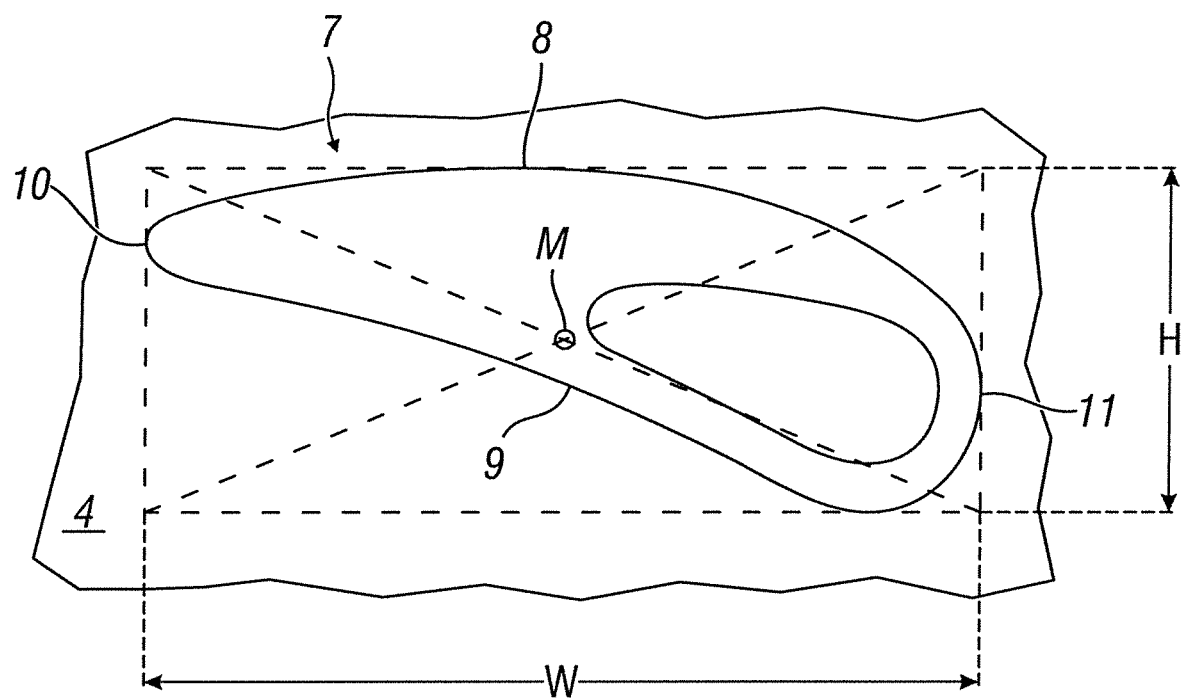
FIG. 4b shows a front view of a hole comprised in the resilient tyre of FIG. 1.

The aperture of each hole 7 present in the lateral surfaces 4, 4' hence has substantially the shape of a wing profile comprising an upper camber 8, a lower camber 9, a top edge 10, and a bottom edge 11 (FIG. 4b). In some embodiments, the upper camber 8 may include and/or at least partially define an upper surface of the wing profile, the lower camber 9 may include and/or at least partially define a lower surface of the wing profile, the top edge 10 may include and/or at least partially define a leading edge of the wing profile, and the bottom edge 11 may include and/or at least partially define a trailing edge of the wing profile.

The aperture of each hole 7 can moreover be inscribed in a rectangle lying in the plane X-Y and having height H, base W, and diagonals such as to intersect in a point M (geometrically known as "centre of the rectangle"). The phrase "inscribed in a rectangle" means that said rectangle is simultaneously tangential to the upper camber 8, to the lower camber 9, to the top edge 10, and to the bottom edge 11 of the aperture.

Preferably, said height H of the rectangle is comprised between 10% and 30% of the section height Q of the lateral surfaces 4, 4' of the resilient tyre 1. More preferably, said height H of the rectangle is 20% of the section height Q of the lateral surfaces 4, 4' of the resilient tyre 1.

The base W of the rectangle is, instead, preferably comprised between 20% and 70% of the section height Q of the lateral surfaces 4, 4' of the resilient tyre 1. More preferably, said base W of the rectangle is 50% of the section height Q of the lateral surfaces 4, 4' of the resilient tyre 1.

For example, in a resilient tyre 1 of radius R of 815 mm and lateral surfaces 4, 4' with a section height Q of 500 mm, the rectangle has a height H of 100 mm and a base W of 240 mm.

For each of the lateral surfaces 4, 4' the holes 7 are at the same distance apart from one another, arranged radially with respect to the axis of rotation of the tyre 1 (FIG. 3).

In a first embodiment of the resilient tyre 1a shown in FIG. 6, the holes 7 made in one lateral surface 4a and the holes 7 made in the other lateral surface 4' are set alongside one another, but oriented with the respective top edges 10 facing in opposite directions.

Figure 7:
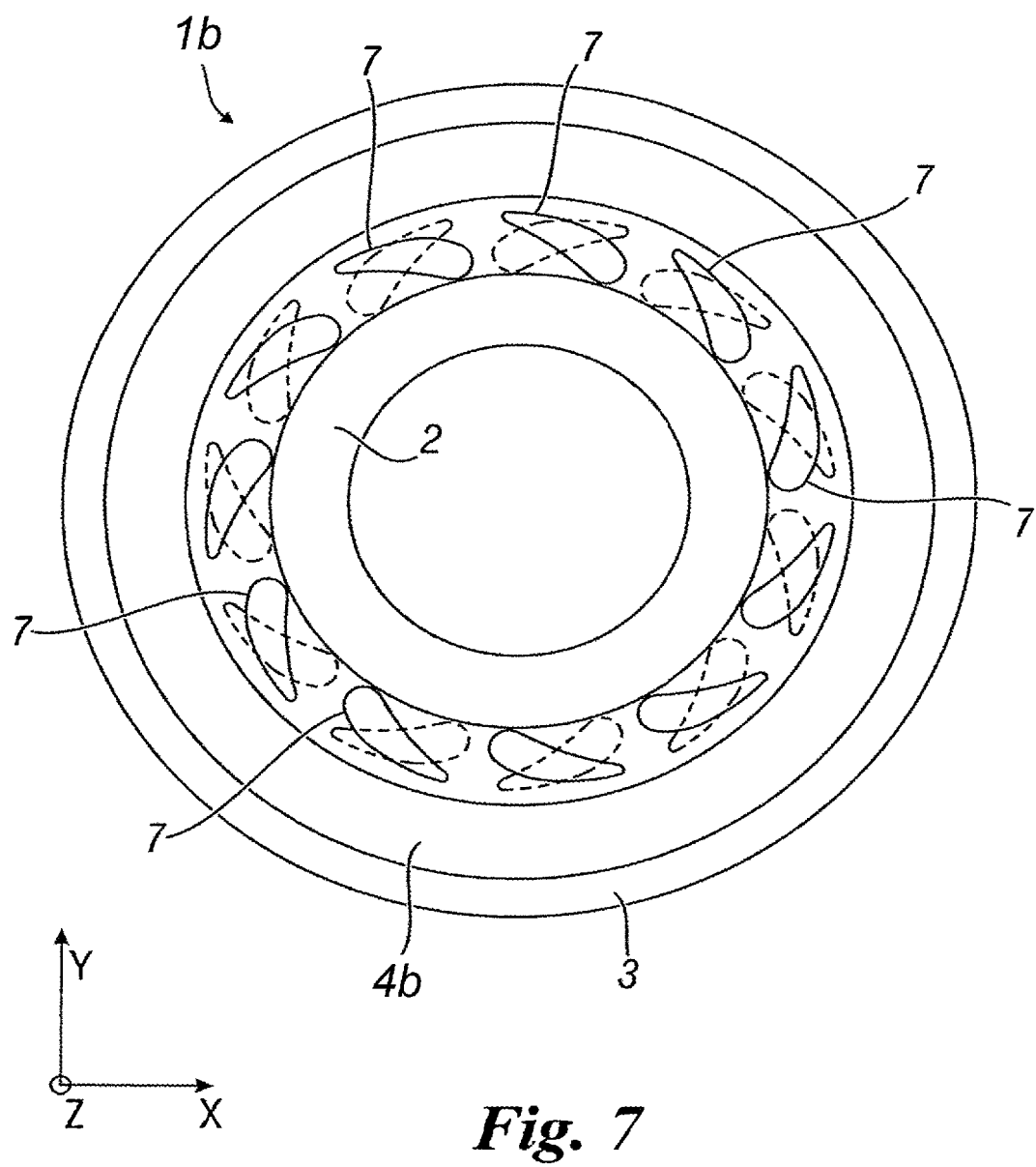

FIG. 7 shows, instead, a second embodiment of the resilient tyre 1b in which the holes 7 made in one lateral surface 4b are offset by half of the pitch 12 with respect to the holes 7 made in the other lateral surface 4'. However, the offset of the holes 7 present in one surface 4b with respect to the holes 7 present in the other surface 4' may differ by half of the pitch 12.

Figure 8:
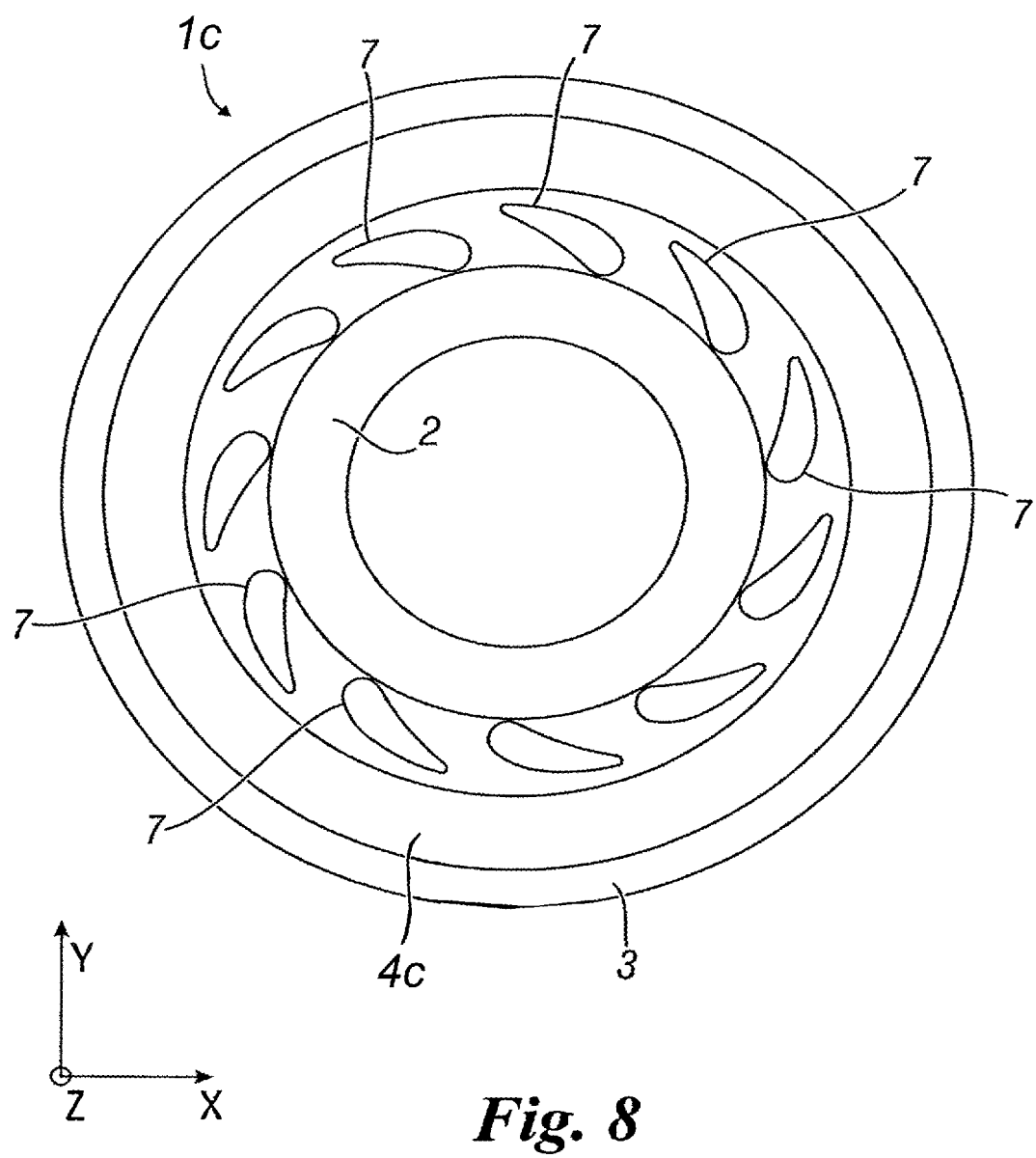

In a third embodiment of the resilient tyre 1c (FIG. 8), the holes 7 made in one lateral surface 4c are specular to the holes 7 made in the other lateral surface 4'. In fact, the holes 7 made in one lateral surface 4c and the holes 7 made in the other lateral surface 4' are superimposed in the view of FIG. 8.

Figure 9:
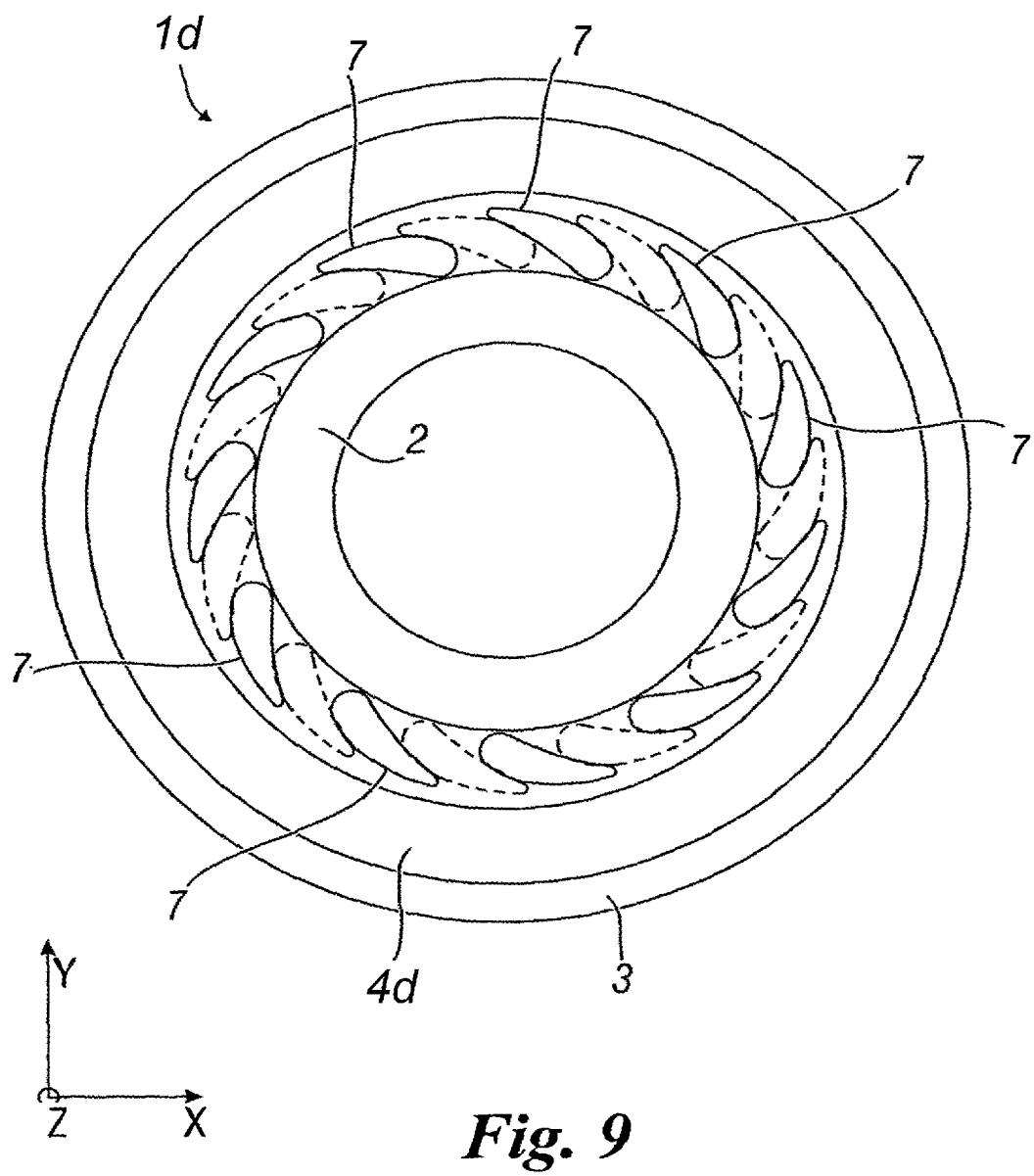

In a fourth embodiment of the resilient tyre 1d shown in FIG. 9, the holes 7 made in one lateral surface 4d are once again specular and moreover offset by half of the pitch 12 with respect to the holes 7 made in the other lateral surface 4'. Also in this case, the offset of the holes 7 present in one surface 4d with respect to the holes 7 present in the other surface 4' may differ by half of the pitch 12.

Alternatively, for greater clarity of description, the shape of the aperture of each hole 7 may be described with reference to the pitch 12 of the resilient tyre 1. Here, by the term "pitch" is understood the distance between two apertures adjacent to one another measured on an imaginary circumference C passing through the points M. Consequently, the pitch is to be understood as the measurement of the arc between the points M of two adjacent apertures, as shown in FIG. 4a.

Using the above reference, the aperture of each hole 7 has an upper camber 8 with a length of a value comprised between 40% and 90% of the length of the pitch 12, and a lower camber 9 with a length of a value comprised between 25% and 75% of the length of the pitch 12. Preferably, the aperture of each hole 7 comprises an upper camber 8 with a length that is approximately 80% of the length of the pitch 12, and a lower camber 9 with a length that is approximately 65% of the length of the pitch 12.

Moreover, each hole 7 has a depth that can reach at most 90% of the width L of the tread 3. Preferably, each hole has a depth equal to 45% of the width L of the tread.

For example, in a resilient tyre 1 having a radius R of 815 mm, a section height Q of the lateral surfaces 4, 4' of 500 mm, and a width L of 610 mm, each hole 7 has a depth of 275 mm.

The number of holes 7 present in each of the two lateral surfaces 4, 4' of the resilient tyre 1 may be comprised between 8 and 20. Preferably, the resilient tyre 1 comprises 11 holes 7.

The particular shape of the holes 7 and their dimensions in proportion to those of the resilient tyre 1 enables creation of a cushioning effect irrespective of the hardness of the mix. Consequently, for the tread 3 of the resilient tyre 1 it is even possible to use hard mixes, for example of a hardness of 70±5 Sh A, thus enhancing the properties of resistance to deterioration (or wear).

In the case of numerous vehicles, such as loaders, the particular shape of the holes 7 is such as to enable the tyre (and in particular the tread 3) to undergo deformation under the weight of the vehicle, thus damping vibrations and impact that have repercussions on the driver.

Thanks to the resilient tyre according to the present invention, and specifically to the particular shape of the cushioning holes 7 provided at the sides of the tyre, the effects of repeated vibrations and impact on the operator are further limited, and the service life of the tyre is increased.

The invention claimed is:

1. A resilient tyre (1, 1a, 1b, 1c, 1d) designed to be used on industrial and construction machinery, said resilient tyre (1, 1a, 1b, 1c, 1d) comprising a plurality of circular layers of elastic material set on top of one another in the radial direction, said layers forming, proceeding from the centre of the resilient tyre (1, 1a, 1b, 1c, 1d) towards the periphery, an inner portion referred to as base (2), an outer portion referred to as tread (3), and two lateral surfaces (4, 4a, 4b, 4c, 4d, 4') with height (Q), said resilient tyre (1, 1a, 1b, 1c, 1d) comprising a plurality of cushioning holes (7) made in both of the lateral surfaces (4, 4a, 4b, 4c, 4d, 4') of the resilient tyre (1, 1a, 1b, 1c, 1d), wherein said cushioning holes (7) substantially have a wing-like shape, wherein an aperture of each cushioning hole (7) in the lateral surface (4, 4a, 4b, 4c, 4d, 4') has a wing profile comprising an upper camber (8), a lower camber (9), a top edge (10), and a bottom edge (11), wherein said aperture can be inscribed in a rectangle having a height (H) and a base (W) in such a way that said rectangle is simultaneously tangential to the upper camber (8), to the lower camber (9), to the top edge (10) and to the bottom edge (11) of said aperture, and wherein said height (H) is 20% of the section height (Q) of the lateral surfaces (4, 4a, 4b, 4c, 4d, 4'), whereas said base (W) is 50% of the section height (Q) of the lateral surfaces (4, 4a, 4b, 4c, 4d, 4').

2. The resilient tyre (1, 1a, 1b, 1c, 1d) according to claim 1, characterized in that each hole (7) has an oblong shape, which, starting from the aperture made in the lateral surface (4, 4a, 4b, 4c, 4d, 4') tapers towards the inside of the tyre (1, 1a, 1b, 1c, 1d).

3. The resilient tyre (1, 1a, 1b, 1c, 1d) according to claim 2, characterized in that said hole (7) comprises a first portion (13), in the proximity of the lateral surface, and a second portion (14), which is more internal, said first portion (13) being tapered with a decrease per unit length that is the same as, or faster than, that of the second portion (14).

4. The resilient tyre (1, 1a, 1b, 1c, 1d) according to claim 1, characterized in that it comprises a number of holes (7) comprised between 8 and 20.

5. The resilient tyre (1, 1a, 1b, 1c, 1d) according to claim 4, characterized in that it comprises 11 holes (7).

6. The resilient tyre (1, 1a, 1b, 1c, 1d) according to claim 1, characterized in that each hole (7) has a depth that can reach at most 90% of the width (L) of the tread (3).

7. The resilient tyre (1, 1a, 1b, 1c, 1d) according to claim 1, characterized in that the holes (7) made in one lateral surface (4, 4a, 4b, 4c, 4d) and the holes (7) made in the other lateral surface (4') are set alongside one another, but oriented with the respective top edges (10) facing in opposite directions.

8. The resilient tyre (1, 1a, 1b, 1c, 1d) according to claim 7, characterized in that the holes (7) made in one lateral surface (4, 4a, 4b, 4c, 4d) are offset in a circumferential direction of the tyre (1, 1a, 1b, 1c, 1d) with respect to the holes (7) made in the other lateral surface (4').

9. The resilient tyre (1, 1a, 1b, 1c, 1d) according to claim 8, characterized in that the diagonals of said rectangle intersect in a point (M), wherein a pitch (12) is a distance between two apertures adjacent to one another measured on an imaginary circumference (C) passing through the points (M), and wherein the holes (7) made in one lateral surface (4, 4a, 4b, 4c, 4d) are offset in the circumferential direction of the tyre (1, 1a, 1b, 1c, 1d) by half of the pitch (12) with respect to the holes (7) made in the other lateral surface (4').

10. The resilient tyre (1, 1a, 1b, 1c, 1d) according to claim 1, characterized in that the holes (7) made in one lateral surface (4, 4a, 4b, 4c, 4d) are specular to the holes (7) made in the other lateral surface (4').

* * * * *